United States Patent [19]

Molter et al.

[11] Patent Number: 5,080,801
[45] Date of Patent: Jan. 14, 1992

[54] MIXED POLYMERS FOR PREVENTING SCALE CAUSED BY MINERAL PROCESSING WATER

[75] Inventors: Kent E. Molter, Naperville; David O. Owen, Aurora; Kevin L. O'Brien, Naperville, all of Ill.

[73] Assignee: Nalco Chemical Company, Naperville, Ill.

[21] Appl. No.: 679,882

[22] Filed: Apr. 3, 1991

[51] Int. Cl.$^5$ .............................................. C02F 5/14
[52] U.S. Cl. ...................................... 210/699; 209/5; 210/700; 210/701; 252/180
[58] Field of Search .................... 209/5; 210/698–701; 252/180

[56] References Cited

U.S. PATENT DOCUMENTS

| | | | |
|---|---|---|---|
| 3,463,730 | 8/1969 | Booth et al. | 210/701 |
| 3,890,228 | 6/1975 | Hwa | 210/701 |
| 4,640,793 | 2/1987 | Persinski et al. | 210/701 |
| 4,711,725 | 12/1987 | Amick et al. | 252/180 |
| 4,869,828 | 9/1989 | Hoots et al. | 210/701 |

OTHER PUBLICATIONS

Failon, B. K., Scale Detection and Control During Mineral Beneficiation, 2-87 (see p. 5).
Geiger, G. E., New Antisealant for Gold Circuits, 1988 (see pp. 277-279).
Nulty, J. H., et al., Antiscaling Reagents: Case Studies, date unknown, (see p. 163).

Primary Examiner—Peter Hruskoci
Attorney, Agent, or Firm—John G. Premo; Robert A. Miller

[57] ABSTRACT

A method of preventing and inhibiting scale on solid surfaces in contact with mineral processing waters which comprises treating such waters with a scale preventing or inhibiting amount of a composition comprising:

| Ingredients | % By Weight |
|---|---|
| A. Polyacrylic acid | 25-65 |
| B. An acrylic acid lower alkyl acrylate ester copolymer which contains from 1-6 carbon atoms in the alkyl group | 25-65 |
| C. An acrylamide terpolymer which contains from 1-80 mole % of acrylic acid and from 1-50 mole % of an alkyl sulfonate substituted acrylamide wherein the alkyl group contains from 1-6 carbon atoms | 0-30 | with polymers A, B, and C having a molecular weight range between 1,000 to 50,000.

3 Claims, 3 Drawing Sheets

MIXED POLYMERS FOR PREVENTING SCALE CAUSED BY MINERAL PROCESSING WATER

INTRODUCTION

Often the only link between seemingly unrelated applications is the use of water as the medium in which separation/extraction of a mineral value from an ore body is performed. This process water becomes host to a variety of ionic species that were once associated with the ore matrix or were introduced to the system for means of control of a particular plant parameter, i.e., pH. Eventually, the mutual solubility of a given anion/cation pair will be exceeded. At this point the salt resulting from combination of these two (or more) ionic species may crystallize out of solution. This precipitate would be of no consequence if it were not adherent; it is defined and acts as a scale only after deposition as a hard mass on metal surfaces.

Formation of scale involves processes of nucleation, crystal growth, and deposition. Nucleation occurs through a variety of means, most commonly those involving relief of supersaturation due to an externally applied stress. Restated, microscopic crystalline nuclei will be formed by certain changes in the physical and chemical environment. For example, changes in pressure, temperature, pH, velocity, or turbulence may initiate the crystallization process.

Gone unchecked, scale formation is objectionable for at least one of the following reasons:

Reduced process capacity as a result of line/valve plugging or lose in pump efficiency. Taken to its natural limit, costly downtime to descale or replace scaled parts may be required.

Reduced heat transfer as a result of fouled heat exchanger tubes or vessel walls. Again, not only is the process more inefficient during the scale growth phase, but valuable operating time is lost during the descaling phase.

PRECIOUS METALS

In precious metals (Au/Ag) recovery systems, calcite ($CaCO_3$) scale formation is prevalent and troublesome. Large quantities of lime (Ca)), usually added to the system to buffer pH, provide a source of calcium and promote alkaline conditions which favor calcium carbonate formation. Problem points include barren sump pumps, carbon columns, leach pads, solution lines, and feedwater make-up points. Fouled carbon columns, binded leach pads, and plugged sprinkler heads translate directly into cumulative reductions in Au/Ag yield. Changes in velocity may induce calcium carbonate formation near the surfaces of the carbon or the unleached ore, and subsequent deposition would decrease recovery of the Au/Ag complex in the former case and decrease extraction of Au/Ag in the latter. Likewise changes in pressure at the orifices of the sprinklers may promote scaling tendency and again ultimately lower leaching efficiency. Pumps and lines plugged because of pressure, turbulence and velocity changes (and the resultant shift in system equilibrium) bring about losses indirectly through downtime. The above regions are typically protected chemically.

COPPER CONCENTRATE

Like precious metals circuits, copper concentration loops operate in an alkaline medium which promotes conditions favorable for calcium carbonate formation. Copious quantities of lime are again used, here to depress pyrite in the flotation circuit and to regulate pH at the optimum level for the action of the collector. Since dissolved calcium levels are often in excess of 1,000 ppm, scaling potential is too great not to be chemically treated. Fouling of X-ray windows is of primary concern to copper mills since the material balance for copper (sulfide) is performed via X-ray measurements on feed ore and exit flotation tailings. Therefore, erratic readings caused by scale build-up may send incorrect signals to reagent pumps, resulting in substantial decreases in recovery. Pumps and solution lines are also targets for protection, for reasons discussed earlier.

COAL

Most coal preparation plants operate under slightly alkaline conditions because of the greater risks of running below neutral pH. Corrosion due to low pH, along with the baseline erosion-corrosion caused by the particulate matter present in all plant water, can significantly reduce the lifetime of a prep plant. The pH is typically adjusted, if necessary, with caustic. Because hardness of process waters is not nearly that of the two above circuits, general scaling tendency is not as great. However, scale may form at points of high turbulence, i.e., pumps. Also, due to the wide variety of anions present in the water, a variety of scales may form, including calcium carbonate, calcium sulfate or gypsum ($CaSO_4.2H_2O$), ferric hydroxide ($Fe(OH)_3$) . . . . Coprecipitation may complicate matters even further, leading to a complex scale or sludge. Chemical treatment of selected regions, such as pumps, is often desirable.

PHOSPHORIC ACID

Unlike the systems already discussed, phosphoric acid production is conducted in a highly acidic environment. For this reason, among others, the acid plants experience scaling problems unique to this industry. The large number of impurities found in the product acid, often supersaturated, contributes to significant scaling throughout the reaction, filtration, storage, and concentration steps. Specifically, high fluorine, sodium, and silicon levels, present in the phosphate rock fed to the reactors, cause sodium fluosilicate ($Na_2SiF_6$) to plate out on agitator shafts reactor walls, and especially in 30% $P_2O_5$ filter lines (because of the vacuum's stress on the system).

ALUMINA

Alumina producers face their own set of scaling circumstances, operating in a highly basic media. Bauxite ore is digested and, following a filtration step to remove the gangue, yields a caustic solution (~200g/l as $Na_2CO_3$) supersaturated with respect to alumina and silicate values. Due to the instability of this liquor, any stress to the system will result in precipitation and ultimately some scale. Prior to recrystallization of the alumina trihydrate from solution, the green liquor is heat exchanged (cooled).

It is generally accepted that this scale is a hydrated sodium aluminosilicate. Scale formation is particularly objectionable here because heat transfer coefficients are substantially reduced and continue to decrease as scale thickness increases. The precipitators themselves are subject to severe alumina trihydrate scaling.

QUANTIFYING SCALING CONDITIONS

Before combating a known or unknown scaling situation it is necessary to evaluate a water's scaling potential, including what specific scale(s) may be expected to form. A complete water analysis, including pH, hardness (primarily Ca), total alkalinity, and total dissolved solids, is the logical starting point, Using this data, the water may be tested for $CaCO_3$ stability directly or indirectly.

CONTROLLING SCALE FORMATION

There are two classes of scale inhibitors, those which function by a stoichiometric relationship and those which are substoichiometric. The former mechanism is known as chelation and involves formation of soluble complex from one chelate molecule (i.e. EDTA) and one cation (i.e. $Ca+^2$). This type of scale prevention is only of mild interest for obvious cost reasons. The later mechanism is referred to as threshold inhibition. That is, a small amount of inhibitor is able to stabilize large quantities of potential scalants. Attention from here on will be focused solely on these types of programs. Organophosphorus compounds, inorganic phosphates, and polymers all work via this "threshold effect," and will each be described in more detail later.

The threshold effect itself is comprised of several independent processes for inhibition, the most important of which are stabilization and dispersancy. Stabilization is a crystal growth inhibition process and dispersancy is a deposition inhibition process. Recall that scale formation involves processes of nucleation, crystal growth, and deposition. By altering any one of these three rates, scale formation may be reduced or eliminated.

Stabilization actually increases the solubility of the scaling species by affecting the net rate of crystal growth. Some inhibitors may be absorbed into the crystal structure and, in this manner, distort its morphology. Other inhibitors function by adsorbing on active growth sites, thus "stunting" crystal growth in certain directions.

In addition to the mineral processing systems described above the inventions capable of preventing or inhibiting scale in other mineral process waters such as those used in processing iron kaolin and titanium bearing ores.

It should be noted that the invention is capable of acting on mineral process waters which are used to process both metalliferous ores and ores that are free of metals such as coal and phosphate rock processing slurries. Also the invention has applicability in preventing scale in the washing of clays such as kaolin.

PRIOR ART

Polymers Used to Control Scale in Mineral Processing Waters

Polymers used in mineral processing systems may usually be classified as either a polyacrylate or a polymaleate. Included in the polyacrylate group are copolymers of acrylic acid and methylacrylate and copolymers of acrylic acid and methylacrylate and copolymers of acrylic acid and acrylamide. The term polyacrylate, unless otherwise qualified will refer in this paper to acrylic acid homopolymers, their salts, or copolymers varying in anionic charge. Polyacrylates, especially homopolymers, are well known for their performance as dispersants. For example, the kaolin industry consumes about 20 to 30 million lb annually of polyacrylate-based dispersants.

THE DRAWINGS

THE THE INVENTION

Figure 1:
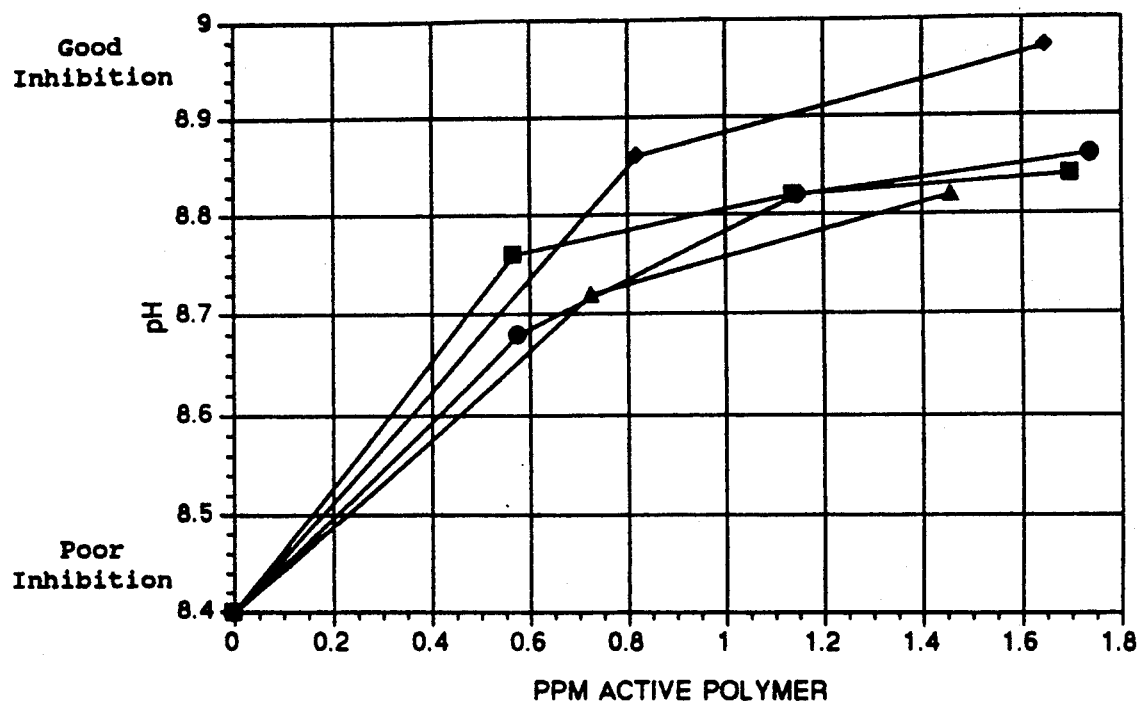
FIG. 1 shows the advantage of the blended polymers over its individual components in inhibiting scale.
Figure 1:
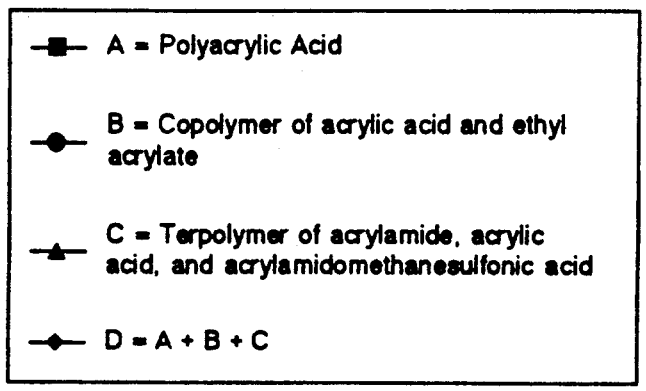

The invention provides a method of preventing and inhibiting scale on solid surfaces in contact with mineral processing waters which comprises treating such waters with a scale preventing or inhibiting amount of a composition comprising:

| Ingredients | % By Weight |
| --- | --- |
| A. Polyacrylic acid | 25-65 |
| B. An acrylic acid lower alkyl acrylate ester copolymer which contains from 1-6 carbon atoms in the alkyl group | 25-65 |
| C. An acrylamide terpolymer which contains from 1-80 mole % of acrylic acid and from 1-50 mole % of an alkyl sulfonate substituted acrylamide wherein the alkyl group contains from 1-6 carbon atoms | 0-30 | with polymers A, B, and C having a molecular weight range between 1,000 to 50,000.

Dosage and Form of the Treatment

The blend of polymers described above are added to mineral processing waters in amounts ranging between 1-200 ppm by weight of the process water. Typical dosages are between about 1-100 ppm.

The dosage will depend upon the severity of the corrosive problem and the pH of the water, its temperature and other soluble components present therein.

The polymer blend is preferably in the form of an aqueous solution which contains about 15-30% by weight of the three polymers. The solubility will vary depending upon the molecular weight and the saturation solubility of the individual polymers in the blend.

In addition to solutions, the polymers may be in the form of water-in-oil emulsions which can be made up into treating solutions by inversion in the presence of a water-soluble surfactant.

The Blend of the Three Polymers

A. Polyacrylic Acid

The polyacrylic acids used as the first polymer in the blend has a weight average molecular weight of from 1,000-50,000. Preferably the molecular weight is from 1,000-10,000 and most preferably 1,000-4,000. It is preferred to use the polyacrylic acid in the form of its water soluble salts, e.g. alkali metal, ammonia or amine. Sodium polyacrylate is preferred. In a preferred embodiment, it is present in the blend of polymers in a preferred weight % ranging between 30-65 and most preferably 40-55.

B. The Acrylic Acid Alkyl Acrylate Copolymer

These copolymers have molecular weight ranges corresponding to those set forth above for polyacrylic acid. The alkyl group in the acrylate ester may vary from 1-6 carbon atoms. Preferred are the copolymers of acrylic acid and methyl or ethyl acrylate. The amount of acrylate ester in the copolymer may vary between 1-20 mole %. Preferably the acrylate ester is present in an amount ranging from 1-10 mole %. The amount of this copolymer in the blend of polymers is in a weight % range between 30-65 and preferably 40-55.

The Terpolymer

The acrylamide terpolymers of the invention contain in their structure, in addition to acrylamide:

A) at least 1 mole % of acrylic acid; and
B) at least 1 mole % of an alkyl sulfonate substituted acrylamide.

In a preferred embodiment A is present in the terpolymer in amounts ranging between 1-80 mole % with a preferred range being 55-75 mole %. B is present in the terpolymer in amounts ranging between 1-50 mole % and most preferably 1-10 mole %.

The alkyl group of the alkyl sulfonate substituted acrylamide contains between 1-6 carbon atoms with a preferred embodiment being an alkyl group of from 1-2 carbon atoms. The alkyl groups may be hydroxy substituted alkyl groups where such alkyl groups contain three or more carbon atoms.

The amount of terpolymer present in the blend of polymers ranges between 0-30% by weight, preferably 0-20% and most preferably 1-10% by weight.

A preferred weight average molecular weight for the terpolymer is between 4,000-20,000 and most preferably between 4,000-10,000.

Illustrative of the preferred amido alkyl sulfonic acids are the amido methyl or amido ethyl propane sulfonates. Other amido alkyl sulfonic acid groupings as well as other terpolymers are described in U.S. Pat. No. 4,703,092 the disclosure of which is incorporated herein by reference.

The Polymer Blend in Combination With Phosphonates to Prevent or Inhibit Scale in Mineral Process Waters The polymer blends as described above may be combined with 5-60% by weight of an organophosphonate scale inhibitor. The preferred organophosphonates are amino tris (methylene phosphonic acid) and 1-hydroxyethylidene-1,1 diphosphonic acid. Other phosphonates that may be used are illustrated in columns 4, 5, 6 and 7 of U.S. Pat. No. 3,904,493, the disclosure of which is incorporated herein by reference.

Specific Compositions of the Invention
Composition D

| Ingredients | % by Weight |
| --- | --- |
| A. Sodium polyacrylate, m.w. 2300 | 48.9 |
| B. Sodium polyacrylate, 5 mole % ethylacrylate, m.w. 2500 | 45.8 |
| C. Acrylamide, 65 mole % acrylic acid, 7 mole % acrylamidomethylsulfonic acid, m.w. 7000 | 5.3 |

Evaluation of the Invention

Test Methods

In the laboratory tests used to generate FIG. 1, the pH of synthetic water, containing calcium ions, carbonate ions, and the treatment, is raised by adding sodium hydroxide. The pH at which calcium carbonate precipitation is induced is a measure of the ability of the treatment to inhibit scale formation. Higher pH values indicate better scale inhibition.

Figure 2:
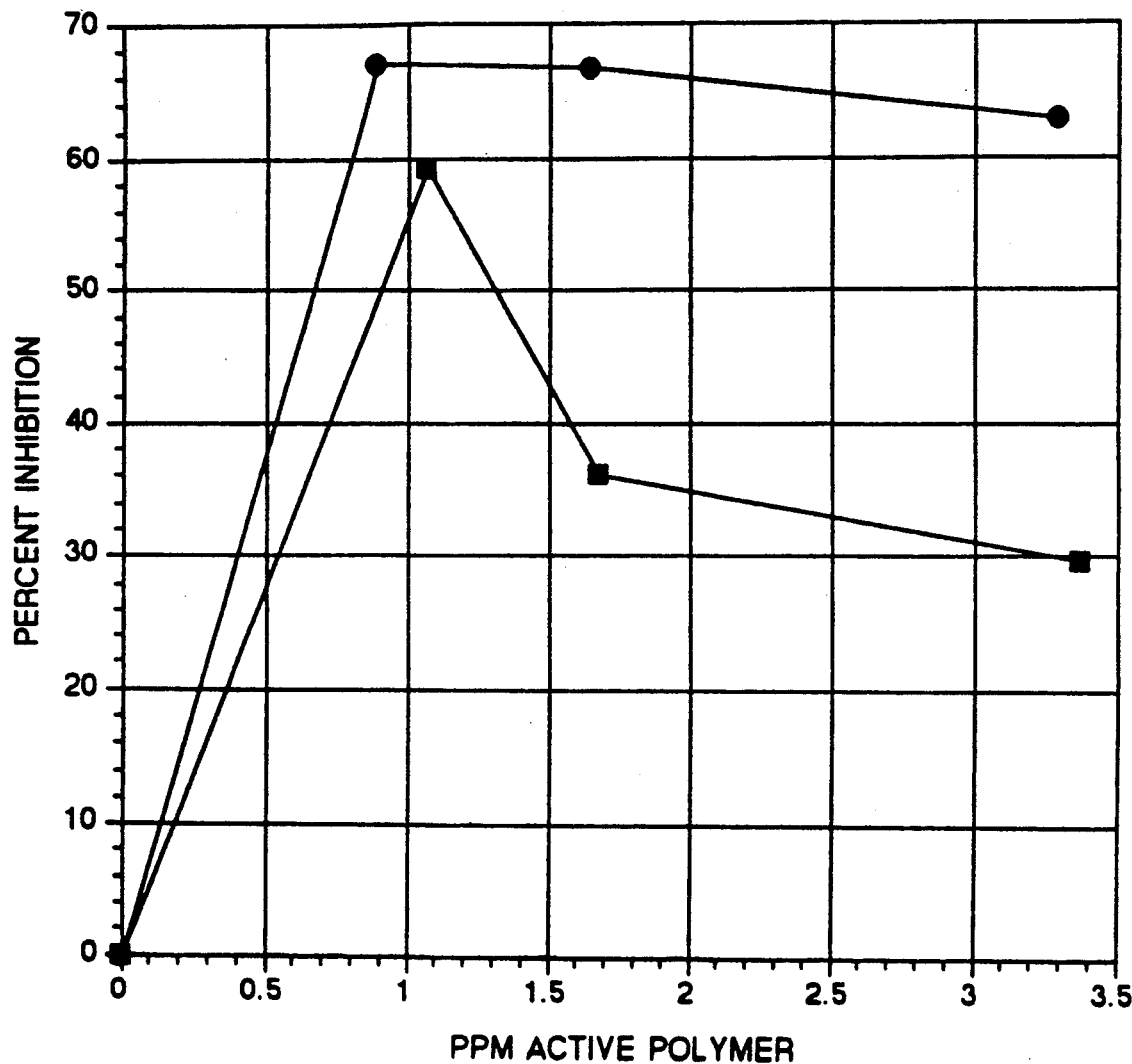
FIG. 2 is similar to FIG. 1.

In the second test used to generate FIG. 2 a ferrous metal coupon was used. Plant water is pumped past metal test coupons and the weight gain on the coupon due to scale deposition is measured. By comparing treated versus untreated water streams, the effectiveness of scale control agents can be determined. In this test, lower values represent better scale inhibition.

In the first test method, the test water corresponded generally to waters generic to precious metal and copper process waters. Using this test method, composition D was tested and compared against its individual polymeric components. These results are shown in FIG. 1. It is evident that the polymer blend is superior to results achieved using its individual components.

Figure 3:
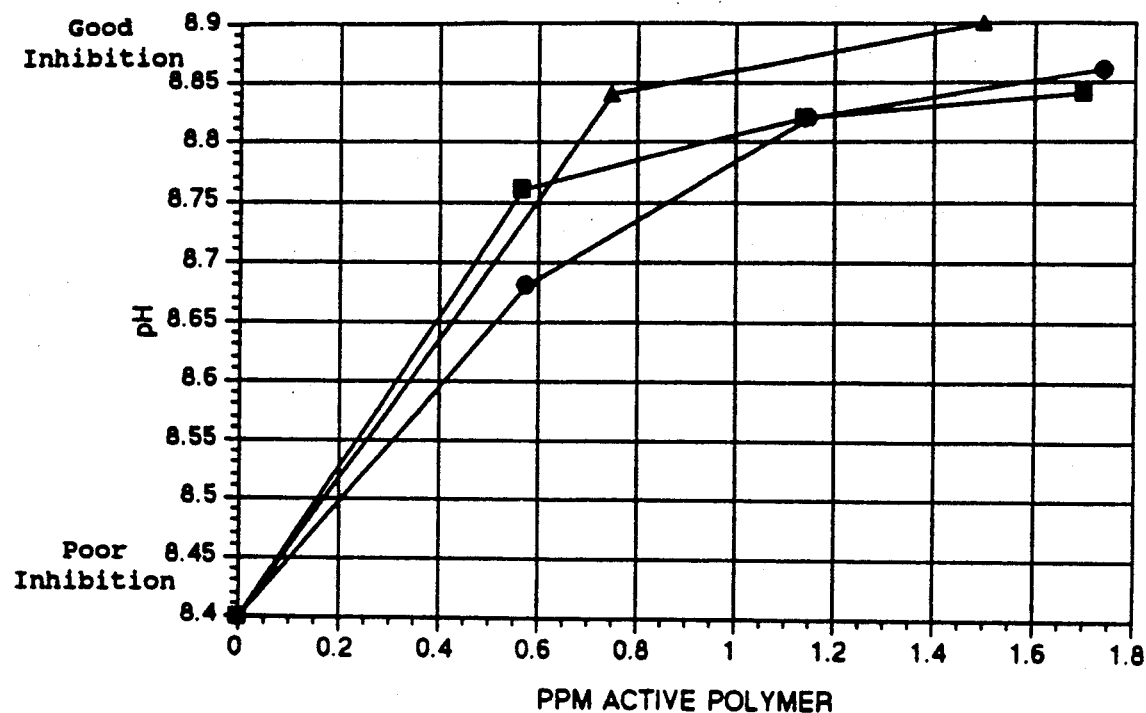
FIG. 3 shows the advantage of combining polymer blends with phosphonates.

The water in test 2 came from a precious metals process water. Using test method two FIG. 2 compares an acrylic acid acrylate ester against Composition D. Here again the polymer blend produces superior scale inhibiting results. Using test method 1 FIG. 3 shows the desirable results achieved when Composition D is combined with a phosphonate.

Having thus described our invention, it claimed as follows:

1. A method of preventing and inhibiting scale on solid surfaces in contact with mineral processing waters which comprises treating such waters with a scale preventing or inhibiting amount of a composition comprising:

| Ingredients | % By Weight |
| --- | --- |
| A. Polyacrylic acid | 40-55 |
| B. An acrylic acid lower alkyl acrylate ester copolymer which contains from 1-6 carbon atoms in the alkyl group | 40-55 |
| C. An acrylamide terpolymer which contains from 1-80 mole % of acrylic acid and from 1-50 mole % of an alkyl sulfonate substituted acrylamide wherein the alkyl group contains from 1-6 carbon atoms | 1-10, | wherein the molecular weight of A and B is in the range between 1,000-4,000 and the molecular weight of C is within the range of 4,000-10,000.

2. The method of claim 1 where the mineral processing water is from the group consisting of waters used in the processing of precious metals, copper, alumina, iron, kaolin, titanium, phosphates and coal.

3. The method of claim 1 where the composition contains from 5-60% by weight of an organophosphonate.

* * * * *